Dec. 8, 1964   D. B. DOOLITTLE   3,160,371
ARRESTING GEAR FOR MOVING OBJECTS
Filed March 20, 1963   3 Sheets-Sheet 1

INVENTOR
Donald B. Doolittle

BY *Herbert M. Birch*

ATTORNEY

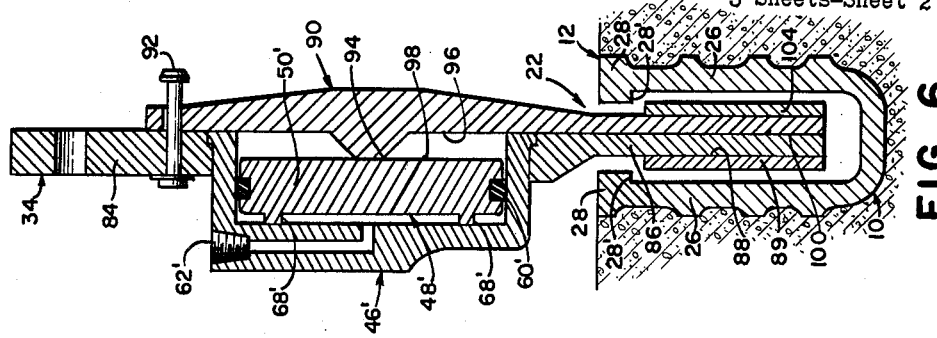
Dec. 8, 1964   D. B. DOOLITTLE   3,160,371
ARRESTING GEAR FOR MOVING OBJECTS
Filed March 20, 1963   3 Sheets-Sheet 2
INVENTOR
Donald B. Doolittle
BY *Herbert M Birch*
ATTORNEY

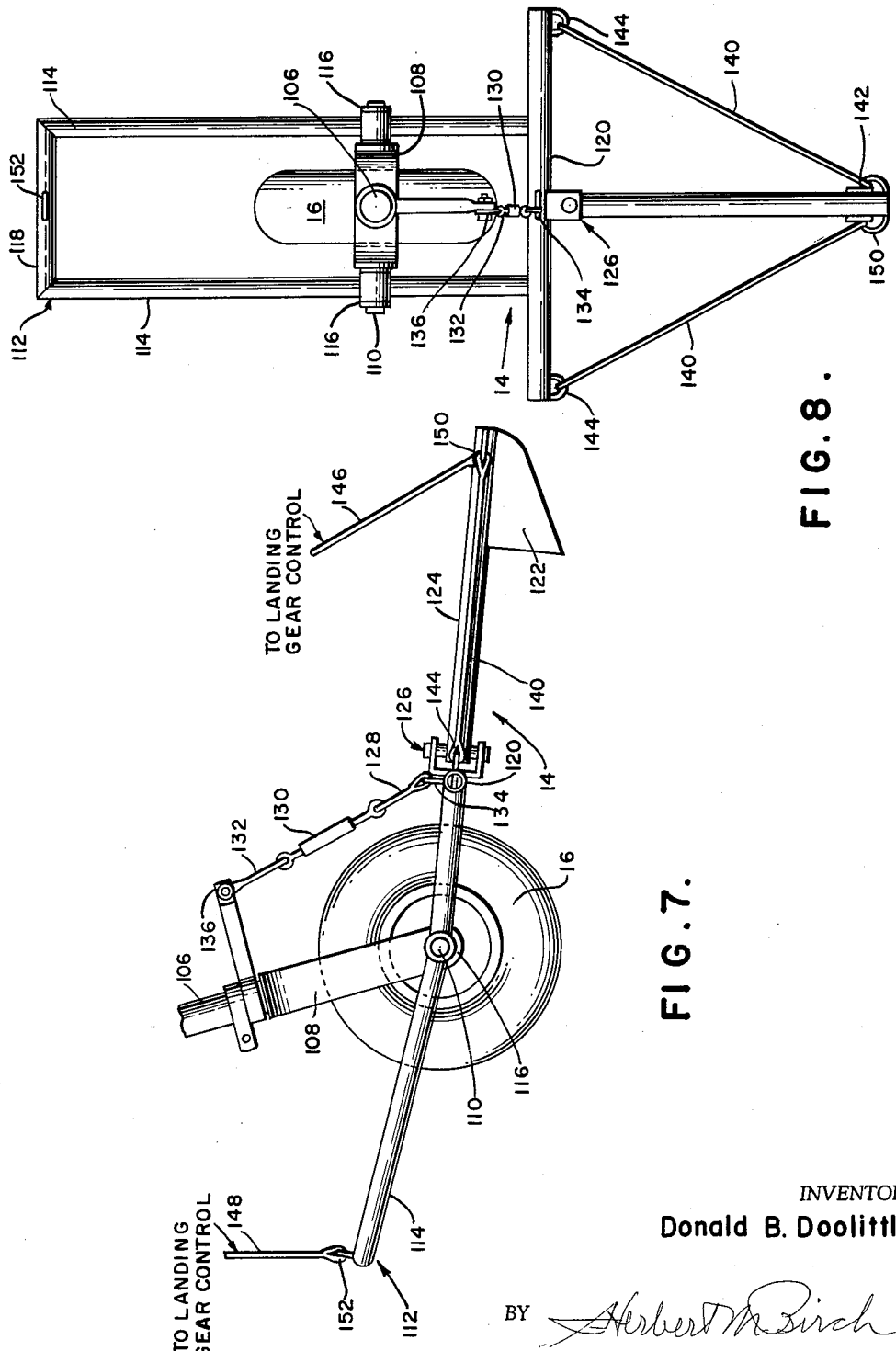

United States Patent Office
3,160,371
Patented Dec. 8, 1964

3,160,371
ARRESTING GEAR FOR MOVING OBJECTS
Donald B. Doolittle, Hockessin, Del., assignor to All American Engineering Company, Wilmington, Del., a corporation of Delaware
Filed Mar. 20, 1963, Ser. No. 266,709
14 Claims. (Cl. 244—110)

This invention relates to arresting gear for moving objects and more particularly, to a sunken slot-type arresting gear embedded in the surface of a runway or the like for the purpose of cooperating with operative means on an aircraft moving along said runway, to selectively apply an arresting force to the said aircraft and bring same to a halt within the confines of the said runway.

It is an object of this invention to provide a novel arresting system comprising sunken slot or channel portions longitudinally disposed in a runway surface having open upper sides flush with said surface and brake means on said aircraft selectively engageable internally of said channel portions for effecting a braking action on said aircraft by engagement with the confines of said channel.

Another object of this invention is to provide a novel arresting system comprising sunken slot or channel portions longitudinally disposed in a runway surface having open upper sides flush with said surface and brake means on said aircraft selectively engageable internally of said channel portions for effecting a braking action on said aircraft by engagement with the confines of said channel and further including guide means on said aircraft permitting positive controlled alignment of said brake means with said channel portion.

These and other objects of this invention will become apparent with reference to the following specification and drawings which relate to several preferred embodiments of the invention.

Figure 1:
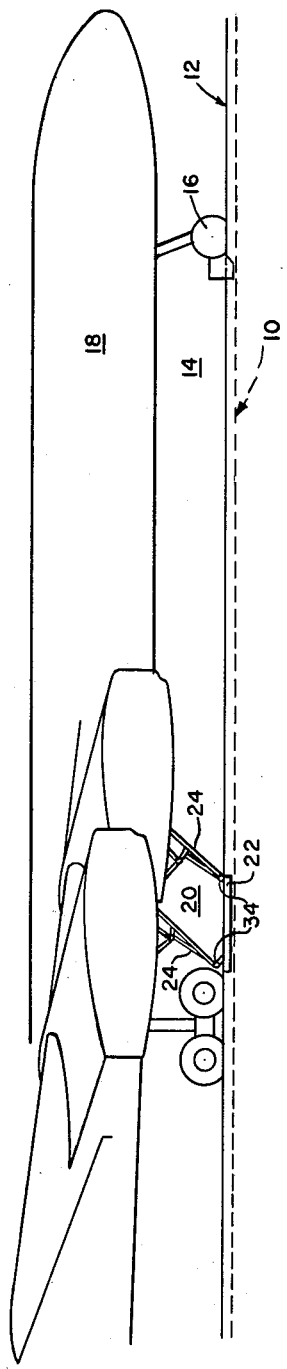
Figure 2:
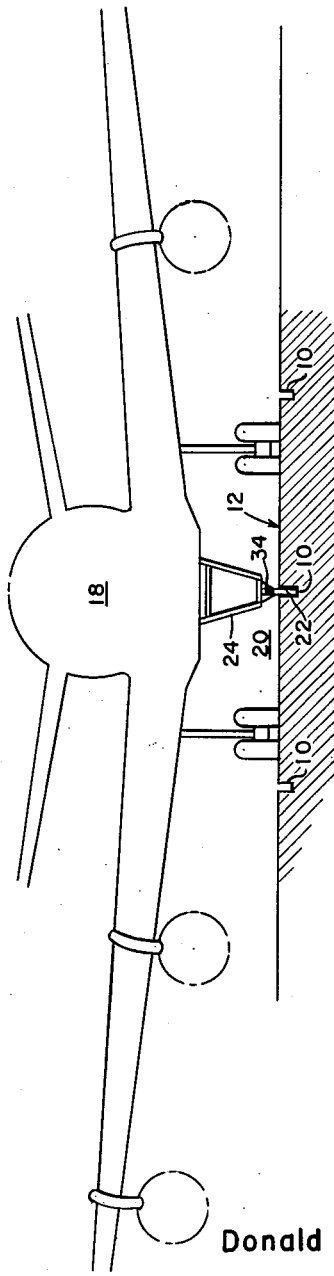

In the drawings:
FIGURE 1 is a side elevation of the invention;
FIGURE 2 is a rear end view of the invention;
FIGURE 3 is a cross-section of a detail of one embodiment of the invention;
FIGURE 4 is a cross-section of a detail of another embodiment of the invention;
FIGURE 5 is a cross-section of a detail of still another embodiment of the invention;
FIGURE 6 is a cross-section of a detail of yet another embodiment of the invention;
FIGURE 7 is a side elevation of a detail of the invention; and
FIGURE 8 is a top elevation of the detail of FIGURE 7.

Referring in detail to the drawings and more particularly to FIGURES 1 and 2, the arresting system of the present invention is shown as comprising a sunken open top slot or channel shaped means 10 in a runway surface 12 extending longitudinally of the length of the said runway surface 12, a guide means 14 on the nose wheel 16 of an aircraft 18 and a retractable brake assembly 20 comprising an elongated brake shoe 22 mounted on a retractable bifilar linkage 24 suspended below the belly portion of the aircraft 18 in line with the guide means 14.

As shown in FIGURE 2, a plurality of the sunken channels 10 may be placed in the runway surface 12 in mutually parallel disposition, whereby selection of a particular channel may be made by the pilot of the aircraft 18 during an arrest operation.

The bifilar suspension 24 is of a reinforced A-frame construction both fore and aft of the brake shoe 22 as can be seen by concurrent reference to FIGURES 1 and 2.

Referring now to FIGURE 3, the arrester channel 10 is shown as comprising a steel shell which is substantially U-shaped in cross-section, the upper ends of the side webs 26 of the U-shaped section having outwardly extending flanges 28 embedded in the runway surface 12 such that the upper surfaces 30 of the flanges 28 are flush with the runway surface 12.

The brake shoe 22 of the brake means 20 is shown in its lowermost or arresting position within the U-shaped channel 10 and comprises a first elongated hollow shoe section 32 integral with a connector means 34 adapted to be connected to the bifilar suspension 24 (FIGURES 1 and 2) and a second elongated hollow shoe section 36 telescopically positioned internally of the said first section 32. The relationship between the first and second shoe sections 32 and 36 is thus structurally analogous to the top and bottom, respectively, of a conventional telescoping cardboard carton or the like.

Mounted within the hollow expansible chamber 38 formed by the respective first and second shoe sections 32 and 36 is a coextensive hollow expander tube 40 having a longitudinally coextensive spring means 42 therein of S-shaped cross-section whereby the walls of the expander tube 40 are maintained at a point of minimum expansion in the expansible chamber 38. A suitable means (not shown) is provided whereby fluid under pressure may be selectively admitted to and exhausted from the expander tube 40.

The structure of the brake shoe 22 is completed by brake linings 44 integral and coextensive with the outer side walls of the first and second brake shoe portions 32 and 36, respectively, said linings 44 being adjacent and operatively engageable with the inner walls of the channel side webs 26.

Referring now to FIGURE 4, another embodiment of the brake shoe 22 is shown as comprising a first shoe section 46 having a rectangular pressure chamber 48 integral therewith at the lower end thereof, and open toward one of the side webs 26 of the arrest channel 10. The chamber 48 being adapted to be completely within the said channel 10 when the brake shoe 22 is in its lowermost or arrest position, and a second shoe section 50 comprising a rectangular piston telescopically movable in said pressure chamber 48.

The outer side wall 52 of the first shoe section 46 is parallel with one of the side webs 26 of the arrest channel 10 and carries a brake lining insert 54 which is substantially coextensive therewith.

The outer end wall 56 of the piston 50 carries an integral coextensive brake lining 58 which is parallel to the other of the side webs 26 of the arrest channel 10.

The piston 50 carries a peripheral sealing ring 60 whereby fluid admitted under pressure to the chamber 48 via the fluid inlet port 62 from a source (not shown) is prevented from leaking by the piston 50.

The piston 50, as shown, is stepped to a larger dimension internally of the chamber 48 to form an outwardly facing shoulder 64 thereon. The shoulder 64 cooperates with inwardly facing shoulders or flanges 66 integral with the first shoe section 46 and adjacent the open side of the pressure chamber 48. The piston 50 carries an integral extended stop 68 on its inner end face which assures a minimum spacing between the piston 50 and the wall 52 of the chamber 48. In the absence of fluid pressure in the chamber 48, the stop 68 on the piston 50 is constrained to abut the inner face of the side wall 52 of the said chamber by means of a compression spring means 70 located between the shoulders 64 and 66 on the piston 50 and first shoe section 46, respectively.

While the brake shoe 22 of FIGURE 4 has been described as including a single pressure chamber 48 and and single piston 50, it is within the scope of the invention to use a plurality of pressure chambers 48 and a corresponding plurality of pistons 50 respectively located therein.

Referring now to FIGURE 5, another embodiment of a piston actuated brake shoe 22 such as shown in FIGURE 4 will now be described. Like parts to the brake shoe 22 of FIGURE 4 bear like primed numerals in FIGURE 5.

In this embodiment, the outer end wall 56' of the piston 50' adjacent one of the side webs 26 of the channel 10 includes an inwardly facing shoulder 72 on a flange 74 at the lowermost edge thereof which abuts a mating shoulder 76 on the lower boundary of the pressure chamber 48'. The upper edge of the piston or second shoe portion 50' comprises a vertically extended shank 78 coextensively juxtaposed with the upper shank portion 80 of the first brake shoe section 46'. The shank 78 is loosely fastened to the shank 80 by means of a plurality of bolts 82 or the like extending through the shank transversely of the brake shoe 22.

Referring now to FIGURE 6, another embodiment similar to those shown in FIGURES 4 and 5 will now be described in which the fluid pressure actuating means for the brake shoe 22 is located above the runway surface 12 rather than within the arrest channel 10 when the said shoe 22 is in its lowermost or arrest position. Here again, like parts of the brake shoe 22 to FIGURE 4 will bear like primed numerals in FIGURE 6.

The first shoe section 46' includes an upper shank portion 84, a central housing portion comprising the pressure chamber 48' and a lower shank portion 86 extending from the lower end wall 88 of the pressure chamber 48' into the arrest channel 10 when the brake shoe 22 is in the arrest position.

The second or lower shank portion 86 of the first shoe section 46' comprises a flat plate within the confines of the arrest channel 10 with the one face 88 thereof adjacent one of the side webs 26 carrying a brake lining 89.

The second brake shoe section 90 comprises an elongated plate coextensive with the lower shank 86 and pressure chamber 48' on the first shoe section 46' and extending upwardly along the upper shank portion 84 thereof where it is loosely fastened thereto by a plurality of bolts 92 or the like extending transversely to the brake shoe 22 as shown through the said upper shank portion 84.

A piston contacting rib or shoulder 94 is provided on the inner surface 96 of the second or resilient shoe section 90 which projects into the chamber 48' into contact with the outer end 98 of the piston 50'.

The inner surface 96 of the second shoe section 90 is normally flush with the inner surface 100 of the lower shank portion 86 of the first shoe section 46'. The outer surface 102 of the second section 90 is parallel to the other of the side webs 26 of the arrest channel 10 and carries a brake lining 104 located directly adjacent the said other of the side webs 26 opposite the brake lining 89 on the lower shank portion 86 of the first shoe section 46'.

This particular embodiment of the brake shoe 22 permits the use of an inwardly extending overhang 28' on the upper flanges 28 of the arrest channel 10 whereby the linings 89 and 104 of the brake shoe 22 are prevented from vertically disengaging from the side webs 26 of the arrest channel 10 during an arrest.

Referring now to FIGURES 7 and 8, one embodiment of the guide mean 14 on the nose wheel 16 of the aircraft 18 will now be described.

The nose wheel 16 is shown mounted on a substantially vertical landing gear strut 106 by means of a yoke 108 and axle 110.

The guide means 14 includes an open rectangular frame 112 including a pair of parallel longitudinal stringers 114 each having a hub portion 116 mounted on an end of the axle 110 on either side of the nose wheel 16. The stringers 114 are joined behind the nose wheel 16 by a cross-member 118.

In front of the nose wheel 16 the stringers 114 are joined together by a second cross-member 120 which is of such a length that the ends thereof extend beyond the connections with the stringers 114, whereby, as shown in FIGURE 8, the rectangular frame 112 in top elevation resembles an inverted T-shaped structure with a bifurcated leg.

A guide blade 122 adapted to be lowered into the arrest channel 10 is mounted on the forward end of an elongated bar 124 which is connected at its other end by a whiffletree-type pivot connection 126 at the center of the second cross member 120 on the frame 112.

The lower limit of movement of the guide blade 122 and hence, its depth in the arrest channel 10 is controlled by an in-line combination of a first cable 128, a turnbuckle 130 and a second cable 132 extending from a connection 134 on the second cross member 120 adjacent the pivot coupling 126 of a connection 136 on the vertical strut 106 of the landing gear.

A pair of nylon guy-lines 140 extending from connections 142 on either side of the forward end of the guide blade bar 124 to connections 144 on either end of the second cross member 120 are provided to center the guide blade 122 and provide means whereby a shock absorbing action is provided when the guide blade 122 engages the arrest channel 10 on the bias with respect to the line of travel of the aircraft 18.

The entire frame assembly 112 and the guide blade 122 may be vertically rocked about the axle 110 by means of fore and aft control cables 146 and 148, respectively, extending from connector rings 150 and 152, respectively, on the forward end of the guide blade bar 124 and the first cross member 118. The control cables 146 and 148 may be suitably interconnected with the landing gear control (not shown) such that the nose wheel 16 may be properly retracted.

*Operation*

Referring to FIGURES 1 and 2, the general operation of the arrest system of the invention is as follows:

When the aircraft 18 engages the runway 12, the pilot lowers the guide blade 122 (which may either be fore or aft of the nose wheel 16) and guides the aircraft on a gradual bias with respect to a preselected one of the parallel arrest channels 10 in the runway 12 whereby the guide blade 122 drops into the arrest channel 10 constraining the aircraft 18 to track along the arrest channel 10.

The brake means 20 is then energized causing the brake linings of the particular embodiment of brake shoe 22 being utilized to frictionally engage the side webs 26 of the arrest channel 10 and thereby impart an arresting or braking force to the aircraft 18.

If the embodiment of FIGURE 3 of the brake shoe 22 is used, the expander tube 40 is caused to be filled with fluid under pressure causing the tube to expand in the chamber 38 and force apart the first and second brake shoe sections 32 and 36, respectively, causing the brake linings 44 thereon to engage the side webs 26 of the arrest channel 10.

In the embodiment of FIGURE 4, the admission of fluid under pressure to the chamber 48 via the inlet port 62 causes the piston 50 to move outward in the said chamber 48 against the force of the spring means 70 and engage its brake lining 58 with one side web 26 of the arrest channel 10. The reaction from this engagement forces the brake lining 54 on the first brake shoe section 46 to the other side web 26 of the arrest channel 10. Upon removal of the pressure in the chamber 48, the spring 70 acts to disengage the said brake linings 54 and 58 from the side webs 26.

In the embodiment of FIGURE 5, admission of fluid under pressure to the chamber 48' via the inlet port 62' forces the piston 50' outward in the said chamber 48' causing both its brake lining 58' and the brake lining 54' on the first brake shoe section 46' to engage their respectively adjacent side webs 26 of the arrest channel 10. Upon removal of the pressure in the chamber 48' the said brake linings 54' and 58' will disengage from the side webs 26.

In the embodiment of FIGURE 6, the admission of fluid under pressure to the chamber 48' causes the piston 50' to engage the rib 94 on the second shoe section or plate 90 forcing the inner face 100 of the lower shank portion 86 of the first shoe section 46' away from the inner face 96 of the second section 90, whereby the brake linings 89 and 104, respectively, are engaged with the adjacent side webs 26 of the arrest channel 10. In case of vertical motion of the brake shoe 22, the upper portions of the brake linings 89 and 104 will be limited in their maximum vertical motion by the internal overhangs 28' on either side of the arrest channel 10 upon removal of the pressure the said brake linings 89 and 104 will disengage from the side webs 26.

Referring to FIGURES 7 and 8, the whiffle-tree pivot coupling 126 and the nylon guy-lines 140 by means of the inherent resilience in the nylon guy-lines act to allow an impact absorbing side play of the guide blade 122 and guide blade bar 124 when the aircraft is moving on the bias with respect to the arrest channel at the time of engagement therewith of the guide blade 122. Thus, no undue strain or shock is imparted to the nose wheel gear of the aircraft 18.

As can be seen from the foregoing specification and drawings, this invention provides a new and novel arrest system for aircraft or other moving objects moving along a surface whereby a positive arresting action may be performed thereon by means on the moving object frictionally engaging fixed means immediately below the said surface.

It is to be understood that the embodiments shown and described herein are for the purpose of example only and are not intended to limit the scope of the appended claims.

What is claimed is:

1. An arrest system for arresting the movement of an object moving in a path over a surface comprising an open arrest channel embedded in said surface and extending downward from said surface, guide means on said object for engaging said arrest channel whereby said object is constrained to track along said channel over said surface and brake means mounted on said object and selectively positionable within said channel subsequent to the engagement of said channel by said guide means, said guide means being universally mounted to permit the same to swing laterally and vertically, said brake means including means for frictionally engaging said arrest channel to arrest the motion of said moving object.

2. An arrest system for arresting the movement of an object moving in a path over a surface comprising an open arrest channel embedded in said surface and extending downward from said surface, guide means on said object for engaging said arrest channel whereby said object is constrained to track along said channel over said surface and brake means mounted on said object and selectively positionable within said channel subsequent to the engagement of said channel by said guide means, said brake means including means for frictionally engaging said arrest channel to arrest the motion of said moving object, said object comprising an aircraft, said aircraft including a fuselage and a nose wheel assembly suspended from said fuselage, and wherein said guide means comprises a vertically movable guide blade mounted on said nose wheel assembly adapted to ride along said surface and drop into said arrest channel upon engagement therewith, whereby said fuselage is constrained to track along said arrest channel.

3. The invention defined in claim 2, wherein said nose wheel assembly further includes a nose wheel adapted to ride along said surface and an axle for said nose wheel, and said guide means further includes a frame member around said nose wheel pivotally mounted intermediate the ends thereof on said axle for pivotal movement in a vertical plane with respect to said surface and a supporting bar for said guide blade movable vertically with said frame and pivotally mounted thereon at one end for movement in a plane parallel to said surface, the other end of said supporting bar carrying said guide blade and being constrained centrally of said frame in the line of travel of said nose wheel by means of elastic guy lines, said guy lines acting to absorb shocks generated by the engagement of said guide blade with said arrest channel.

4. The invention defined in claim 1, wherein said brake means comprises a vertically retractable frame structure mounted on said object, and an elongated brake shoe mounted on said frame structure, said brake shoe being adapted to be lowered into said arrest channel.

5. The invention defined in claim 4, wherein said brake shoe comprises a first shoe section, a second shoe section relatively movable toward and away from said first shoe section, and an expansible fluid chamber intermediate said first and second sections.

6. In an arrest system for arresting the movement of an object moving in a path over a surface, said system including an open arrest channel embedded in said surface and extending downward from said surface, a brake means on said object for engaging said arrest channel comprising a brake shoe positioned within said arrest channel comprising a first shoe section, a second shoe section relatively movable toward and away from said first shoe section, an expansible fluid chamber intermediate said first and second sections, friction means mounted on said first and second shoe sections for frictional engagement with said arrest channel, and a fluid line from a suitable source of fluid supply for expanding said expansible fluid chamber.

7. An arrest system for arresting the movement of an object moving in a path over a surface comprising an open arrest channel embedded in said surface and extending downward from said surface, guide means on said object for engaging said arrest channel whereby said object is constrained to track along said channel over said surface and brake means mounted on said object and selectively positionable within said channel subsequent to the engagement of said channel by said guide means, said brake means including means for frictionally engaging said arrest channel to arrest the motion of said moving object, said brake means comprising vertically retractable frame structure mounted on said object, and an elongated brake shoe mounted on said frame structure, said brake shoe being adapted to be lowered into said arrest channel, said brake shoe comprising a first shoe section, a second shoe section relatively movable toward and away from said first shoe section, and an expansible fluid chamber intermediate said first and second sections, said first shoe section comprising a body portion having a chamber therein open on one side and said second shoe section comprising a body portion including actuating means extending into said chamber, said first section further including a fluid pressure inlet connected with said chamber whereby admission of fluid under pressure to said chamber creates a force acting on said actuating means to force said second section away from said first section.

8. An arrest system for arresting the movement of an object moving in a path over a surface comprising an open arrest channel embedded in said surface and extending downward from said surface, guide means on said object for engaging said arrest channel whereby said object is constrained to track along said channel over said surface and brake means mounted on said object and selectively positionable within said channel subsequent to the engagement of said channel by said guide means, said brake means including means for frictionally engaging said arrest channel to arrest the motion of said moving object, said brake means comprising a vertically retractable frame structure mounted on said object, and an elongated brake shoe mounted on said frame structure, said brake shoe being adapted to be lowered into said arrest channel, said brake shoe comprising a first shoe section, a second shoe section relatively movable toward and away from said first shoe section, and an expansible fluid chamber intermediate said first and second sections, said first shoe section comprising a body portion having an open cavity therein and said second shoe section comprising a piston conformed to close said cavity and positioned internally of said cavity for reciprocal inward and outward movement therein.

9. An arrest system for arresting the movement of an object moving in a path over a surface comprising an open arrest channel embedded in said surface and extending downward from said surface, guide means on said object for engaging said arrest channel whereby said object is constrained to track along said channel over said surface and brake means mounted on said object and selectively positionable within said channel subsequent to the engagement of said channel by said guide means, said brake means including means for frictionally engaging said arrest channel to arrest the motion of said moving object, said brake means comprising a vertically retractable frame structure mounted on said object, and an elongated brake shoe mounted on said frame structure, said brake shoe being adapted to be lowered into said arrest channel, said brake shoe comprising a first shoe section, a second shoe section relatively movable toward and away from said first shoe section, and an expansible fluid chamber intermediate said first and second sections, said first section comprising a body portion including a vertical shank connected with said retractable frame and an open cavity in said body portion and said second shoe section comprising a piston conformed to close said cavity and positioned internally of said cavity for reciprocal inward and outward movement therein and a shank portion integral with said piston and vertically coextensive with a portion of said vertical shank on said first shoe section, said shank portion being coupled at its upper extremity to said vertical shank.

10. An arrest system for arresting the movement of an object moving in a path over a surface comprising an open arrest channel embedded in said surface and extending downward from said surface, guide means on said object for engaging said arrest channel whereby said object is constrained to track along said channel over said surface and brake means mounted on said object and selectively positionable within said channel subsequent to the engagement of said channel by said guide means, said brake means including means for frictionally engaging said arrest channel to arrest the motion of said moving object, said brake means comprising a vertically retractable frame structure mounted on said object, and an elongated brake shoe mounted on said frame structure, said brake shoe being adapted to be lowered into said arrest channel, said brake shoe comprising a first shoe section, a second shoe section relatively movable toward and away from said first shoe section, and an expansible fluid chamber intermediate said first and second sections, said first section comprising a body portion having an open cavity therein, a piston conformed to close said cavity and positioned for reciprocal inward and outward movement therein, a vertical upper shank connected with said retractable frame above said cavity and a vertical lower shank below said cavity adapted to extend into said arrest channel and said second shoe section comprising a plate anchored at one end to said vertical upper shank and extending coextensively with said first shoe section from said upper shank, across said cavity externally of said piston and to the lower end of said vertical lower shank, said plate including an actuating rib extending internally of said cavity into engagement with said piston, said plate being coupled at its upper extremity with said vertical upper shank.

11. An arrest system for arresting the movement of an object moving in a path over a surface comprising an open arrest channel embedded in said surface and extending downward from said surface, guide means on said object for engaging said arrest channel whereby said object is constrained to track along said channel over said surface and brake means mounted on said object and selectively positionable within said channel subsequent to the engagement of said channel by said guide means, said brake means including means for frictionally engaging said arrest channel to arrest the motion of said moving object, said brake means comprising a vertically retractable frame structure mounted on said object, and an elongated brake shoe mounted on said frame structure, said brake shoe being adapted to be lowered into said arrest channel, and comprising a first shoe section, a second shoe section relatively movable toward and away from said first shoe section, and an expansible fluid chamber intermediate said first and second sections, and wherein said means for frictionally engaging said arrest channel comprise brake linings on said first and second shoe sections, said first shoe section comprising a body portion having a chamber therein open on one side and said second shoe section comprises a body portion including actuating means extending into said chamber, said first section further including a fluid pressure inlet connected with said chamber whereby admission of fluid under pressure to said chamber creates a force acting on said actuating means to force said second section away from said first section.

12. An arrest system for arresting the movement of an object moving in a path over a surface comprising an open arrest channel embedded in said surface and extending downward from said surface, guide means on said object for engaging said arrest channel whereby said object is constrained to track along said channel over said surface and brake means mounted on said object and selectively positionable within said channel subsequent to the engagement of said channel by said guide means, said brake means including means for frictionally engaging said arrest channel to arrest the motion of said moving object, said brake means comprising a vertically retractable frame structure mounted on said object, and an elongated brake shoe mounted on said frame structure, said brake shoe being adapted to be lowered into said arrest channel, and comprising a first shoe section, a second shoe section relatively movable toward and away from said first shoe section, and an expansible fluid chamber intermediate said first and second sections, and wherein said means for frictionally engaging said arrest channel comprise brake linings on said first and second shoe sections, said first shoe section comprising a body portion having an open cavity therein and said second shoe section comprises a piston conformed to close said cavity and positioned internally of said cavity for reciprocal inward and outward movement therein.

13. In arrest system for arresting the movement of an object moving in a path over a surface comprising an open arrest channel embedded in said surface and extending downward from said surface, guide means on said object for engaging said arrest channel whereby said object is constrained to track along said channel over said surface and brake means mounted on said object and selectively positionable within said channel subsequent to the engagement of said channel by said guide means, said brake means including means for frictionally engaging said arrest channel to arrest the motion of said moving object, said brake means comprising a vertically retractable frame structure mounted on said object, and an elongated brake shoe mounted on said frame structure, said brake shoe being adapted to be lowered into said arrest channel, and comprising a first shoe section, a second shoe section relatively movable toward and away from said first shoe section, and an expansible fluid chamber intermediate said first and second sections, and wherein said means for frictionally engaging said arrest channel comprise brake linings on said first and second shoe sections, said first section comprising a body portion including a vertical shank connected with said retractable frame and an open cavity in said body portion and said second shoe section comprises a piston conformed to close said cavity and positioned internally of said cavity for reciprocal inward and outward movement therein and a shank portion integral with said piston and vertically coextensive with a portion of said vertical shank on said first shoe section, said shank portion being coupled at its upper extremity to said vertical shank.

14. An arrest system for arresting the movement of an object moving in a path over a surface comprising an open arrest channel embedded in said surface and extending downward from said surface, guide means on said object for engaging said arrest channel whereby said object is constrained to track along said channel over said surface and brake means mounted on said object and selectively positionable within said channel subsequent to the engagement of said channel by said guide means, said brake means including means for frictionally engaging said arrest channel to arrest the motion of said moving object, said brake means comprising a vertically retractable frame structure mounted on said object, and an elongated brake shoe mounted on said frame structure, said brake shoe being adapted to be lowered into said arrest channel, and comprising a first shoe section, a second shoe section relatively movable toward and way from said first shoe section, and an expansible fluid chamber intermediate said first and second sections, and wherein said means for frictionally engaging said arrest channel comprise brake linings on said first and second shoe sections, said first section comprising a body portion having an open cavity therein, a piston conformed to close said cavity and positioned for reciprocal inward and outward movement therein, a vertical upper shank connected with said retractable frame above said cavity and a vertical lower shank below said cavity adapted to extend into said arrest channel and said second shoe section comprises a plate anchored at one end to said vertical upper shank and extending coextensively with said first shoe section from said upper shank, across said cavity externally of said piston and to the lower end of said vertical lower shank, said plate including an actuating rib extending internally of said cavity into engagement with said piston, said plate being coupled at its upper extremity with said vertical upper shank.

References Cited in the file of this patent
UNITED STATES PATENTS

| | | |
|---|---|---|
| 1,710,290 | Broyles | Apr. 23, 1929 |
| 3,067,697 | Doolittle | Dec. 11, 1962 |